(12) United States Patent
Morimura

(10) Patent No.: US 10,145,419 B2
(45) Date of Patent: Dec. 4, 2018

(54) BEARING LUBRICATION STRUCTURE FOR ROTATION UNIT

(71) Applicant: OKUMA CORPORATION, Niwa-gun (JP)

(72) Inventor: Shoichi Morimura, Niwa-gun (JP)

(73) Assignee: OKUMA CORPORATION, Niwa-gun (JP)

( * ) Notice: Subject to any disclaimer, the term of this patent is extended or adjusted under 35 U.S.C. 154(b) by 0 days.

(21) Appl. No.: 15/635,512

(22) Filed: Jun. 28, 2017

(65) Prior Publication Data

US 2018/0003237 A1 Jan. 4, 2018

(30) Foreign Application Priority Data

Jul. 1, 2016 (JP) ................................. 2016-131699

(51) Int. Cl.
*F16C 33/78* (2006.01)
*F16C 19/26* (2006.01)
*F16C 33/66* (2006.01)

(52) U.S. Cl.
CPC .......... *F16C 33/7883* (2013.01); *F16C 19/26* (2013.01); *F16C 33/6629* (2013.01); *F16C 2322/39* (2013.01)

(58) Field of Classification Search
CPC .............. F16C 33/6603; F16C 33/785; F16C 33/7859; F16C 33/7863; F16C 33/6629; F16C 33/7886; F16C 19/26; F16C 2322/39; F16J 15/16–15/43
See application file for complete search history.

(56) References Cited

U.S. PATENT DOCUMENTS

| | | | | | |
|---|---|---|---|---|---|
| 1,722,490 | A | * | 7/1929 | Bott | F16C 33/7843 16/DIG. 27 |
| 2,375,166 | A | * | 5/1945 | Cooper | F16C 33/80 277/420 |
| 3,101,954 | A | * | 8/1963 | Huddle | F16C 33/78 277/402 |
| 3,663,077 | A | * | 5/1972 | Nakamura | F16C 33/6603 384/473 |
| 3,838,898 | A | * | 10/1974 | Bird | F16C 33/7873 384/487 |
| 4,458,957 | A | * | 7/1984 | Greener | B65G 39/09 277/420 |

(Continued)

FOREIGN PATENT DOCUMENTS

JP 2006090432 A * 4/2006 ............ F16C 33/664
JP 2011-208662 A 10/2011

*Primary Examiner* — Alan B Waits
(74) *Attorney, Agent, or Firm* — Locke Lord LLP

(57) ABSTRACT

Provided is a bearing lubrication structure for a rotation unit having a bearing that is of a grease lubrication type in which the bearing is provided at both sides thereof with a seal structure, wherein the grease lubrication performance is improved. The bearing is provided on both sides thereof with fixed-side seal portions, and rotating side seal portions that are opposed thereto, respectively. The fixed-side seal portion is provided with a shield. The distance from the inner periphery of the shield to the axis of the rotary shaft varies depending on the location of a point on the inner periphery. The shield, which is one of the two shields, and the shield, which is the other one, are arranged so as not to have plane symmetry.

4 Claims, 6 Drawing Sheets

(56) References Cited

U.S. PATENT DOCUMENTS

| | | | | |
|---|---|---|---|---|
| 5,722,664 | A * | 3/1998 | Otto | F16C 33/7813 |
| | | | | 277/559 |
| 6,595,695 | B1 * | 7/2003 | Goto | F16C 33/7853 |
| | | | | 384/482 |
| 2001/0045335 | A1 * | 11/2001 | Takeda | F16C 33/7846 |
| | | | | 192/98 |
| 2001/0053255 | A1 * | 12/2001 | Obara | F16C 33/78 |
| | | | | 384/480 |
| 2003/0001341 | A1 * | 1/2003 | Sakata | F16C 19/49 |
| | | | | 277/423 |
| 2008/0014076 | A1 * | 1/2008 | Roddis | F16J 15/164 |
| | | | | 415/174.2 |
| 2008/0152269 | A1 * | 6/2008 | Habibvand | F16C 19/163 |
| | | | | 384/100 |
| 2016/0369846 | A1 * | 12/2016 | Stocker | F16C 13/006 |

\* cited by examiner

BEARING LUBRICATION STRUCTURE FOR ROTATION UNIT

CROSS-REFERENCE TO RELATED APPLICATIONS

The present application claims priority under U. S. C. § 119 to Japanese Patent Application No. 2016-131699, filed Jul. 1, 2016, entitled "Bearing Lubrication Structure for Rotation Unit." The contents of this application are incorporated herein by reference in their entirety.

BACKGROUND OF THE INVENTION

Field of the Invention/Technical Field

The present invention relates to a bearing lubrication structure for a rotation unit that includes a plurality of bearings and a main spindle rotatably supported by the bearings and that is suitable for use in, for example, a machine tool.

Background

In some of the rotation units for use in machine tools, such as a spindle unit composed of a main spindle and bearings, the bearings having a large diameter and having high rigidity are required to be rotated at high speed, and the bearings are thus used extremely severely. Therefore, bearing lubrication techniques are of extreme importance. Under such circumstances, grease lubrication has been recently attracting the attention again out of consideration for environmental problems because it does not require supplying air or oil and it is inexpensive. The great amount of grease filled in the bearing arrangement adheres to both sides of a rolling surface thereof. During operation of the rotation unit, base oil exudes from the grease, which is supplied to the rolling surface whereby lubrication is achieved. In the case where the spindle unit is subjected to grease lubrication, using the bearings extremely severely as described above raises an issue related to the resistance to grease stirring. Consequently, in the case where the bearing is lubricated with grease as described above in contrast to the case where the bearing is used otherwise, the amount of grease to be filled needs to be reduced in order to reduce heating.

The small amount of grease is greatly affected by leakage of grease and its base oil to the outside the bearing, or by grease degradation caused by foreign matter contaminating the grease inside the bearing, which can extremely shorten the service life of the bearing. In order to prevent such unwanted situations, a bearing lubrication structure provided at both sides of the bearing with a seal structure is widely used, as disclosed in Japanese Unexamined Patent Application Publication No. 2011-208662 (Patent Literature 1), for example.

FIG. 6 shows a conventional bearing lubrication structure for a rotation unit, which is used in a spindle unit of a machine tool. A rotation unit 1 includes a rotary shaft 2 rotatably supported by a plurality of bearings 3 (besides the bearing as shown in FIG. 6, another bearing is provided to support another part (not shown) of the rotary shaft 2). To lubricate the bearings 3, the rotation unit 1 is provided with a bearing lubrication structure that uses grease 9.

The bearing 3 includes an inner ring 5 that serves as a rotating ring, an outer ring 6 that serves as a fixed ring, and a plurality of rolling elements 7 retained by a retainer 8. Grease 9 is filled in the bearing 3, which is a lubricant.

The bearing lubrication structure includes a seal structure 21 for preventing grease 9 from leaking to the outside of the bearing 3 and for preventing foreign matter from contaminating grease.

The inner ring 5 is fixed to the rotary shaft 2, and the outer ring 6 is fixed to a housing 4. Spacers 20 are disposed on both sides of the inner ring 5.

A left fixed-side seal portion 22 is formed integrally with the housing 4. The left fixed-side seal portion 22 is located on the left side of a portion where an outer peripheral surface of the outer ring 6 is fitted, supports a left surface of the outer ring 6, and extends to a left end of an outer peripheral surface of the inner ring 5.

The housing 4 is also provided with a right fixed-side seal portion 23, which is formed separately from the housing 4. The right fixed-side seal portion 23 is fixed to the housing 4, supports a right surface of the outer ring 6, and extends to a right end of the outer peripheral surface of the inner ring 5.

The left fixed-side seal portion 22 and the right fixed-side seal portion 23 constitute the seal structure 21.

As shown in FIG. 7, the sectional shape of the left fixed-side seal portion 22 is circular. The inner periphery of the left fixed-side seal portion 22 has the shape of a circle whose center is identical with that of the rotary shaft 2 and which has a predetermined radius. Although not shown, the sectional shape of the right fixed-side seal portion 23 is circular. The inner periphery of the right fixed-side seal portion 23 has the shape of a circle whose center is identical with that of the rotary shaft 2 and which has a same radius as that of the left fixed-side seal portion 22. The left fixed-side seal portion 22 and the right fixed-side seal portion 23 have plane symmetry.

Because an increased amount of grease 9 causes increased resistance to grease stirring and thus causes increased heating, reduction of the amount of grease 9 is required. With the above-described conventional bearing lubrication structure for the rotation unit, the problems that arise when the amount of grease 9 is reduced, such as leakage of grease 9 and foreign matter contamination, is prevented by the seal structure 21.

FIG. 8 shows the conventional bearing lubrication structure for the rotation unit. FIG. 8 illustrates the flow of air inside the bearing 3 arrangement, which is a development view showing a space inside the bearing 3. FIG. 8 reveals that the provision of the fixed-side seal portions 22 and 23 at both sides of the bearing 3 suppresses the flow of air inside the bearing 3. More specifically, air flows in a narrow range on the right side and the left side in the bearing 3, respectively, and air (base oil) on the right side in the bearing 3 does not flow leftward beyond the narrow range whereas air (base oil) on the left side in the bearing 3 does not flow rightward beyond the narrow range. Appropriate lubrication is realized by base oil being supplied to a rolling surface 3a that is in contact with the rolling element 7. Therefore, it is noted that the above-described conventional bearing lubrication structure for the rotation unit has a problem of lubrication performance degradation.

SUMMARY

Technical Problem

When the seal structure is disposed on the both sides of the bearing as disclosed in Patent Literature 1, air flow is generated locally due to the centrifugal force at the time of rotation. However, air flow over the entire bearing cannot be obtained with this structure. In other words, the structure as described in Patent Literature 1 does not have capability of supplying base oil to a center part of the rolling element or the rolling surface. Consequently, the provision of the seal structure produces an advantageous effect that the grease degradation is suppressed, but raises a problem about lubrication, which is the vital point. To solve the problem, required configurations are such that air flow is eliminated inside and outside the bearing, air is caused to flow at the center of the rolling surface of the bearing, and base oil is supplied to the rolling surface.

It is an object of the present invention to provide a bearing lubrication structure for a rotation unit having a bearing that is of a grease lubrication type in which the bearing is provided at both sides thereof with a seal structure, wherein the grease lubrication performance is improved.

Solution to Problem

According to one aspect of the present invention, a bearing lubrication structure for a rotation unit is configured to use grease for bearing lubrication. The rotation unit includes a plurality of bearings and a rotary shaft rotatably supported by the bearings. A seal structure is provided on both sides of each bearing, and shields are provided on a fixed side between the bearing and the seal structure at both sides thereof. In at least one of the shields, a distance from an inner periphery of the shield to an axis of the rotary shaft varies depending on the location of a point on the inner periphery. One of the shields and the other shield are arranged so as not to have plane symmetry.

As long as each shield is disposed on the fixed side, the shield may be disposed at any member that is selected from a housing, a fixed-side seal portion of the seal structure, and a fixed ring of the bearing. Additionally, the shield may be formed integrally with the above-mentioned member on the fixed side, or may be formed separately from such a fixed-side member.

In order to provide the configuration that the distance from the inner periphery of the shield (a radially inner part of a fixed-side seal portion of the seal structure) to the axis of the rotary shaft varies depending on the location of a point on the inner periphery, the inner periphery of the shield needs to have a cross-sectional shape of an eccentric circle with respect to a circle having the center at the axis of the rotary shaft, for example. One of the shields may have a shape identical to that of the other shield, or may have a shape different from that of the other shield. In the case where one of the shields has a shape identical to that of the other shield, when the two shields are arranged such that one shield have the same phase as the other shield (such that the two shields have plane symmetry), advantageous effects of the present invention described below cannot be obtained. Therefore, in the case where the two shields having an identical shape are used, it is required that the shields are arranged so as not to have plane symmetry.

When the rotation unit is rotated, great centrifugal force acts within the space of the bearing, which produces a force to cause air to flow toward the outer diameter side. The provision of the seal structure on the both sides of the bearing allows the reduction of the centrifugal force thus arises.

In addition, in the present invention, the flow of air is produced so as to traverse the rolling surface inside the space of the bearing. Such a flow of air is produced by two factors described below. That is, the first factor is that the distance from the inner periphery of the shield to the axis of the rotary shaft varies depending on the location of a point on the inner periphery, and therefore centrifugal force varies depending on the location of the point of the inner periphery; and the second factor is that one of the shields and the other are arranged so as not to have plane symmetry, and therefore the difference in centrifugal force that acts on the bearing between one side and the other side occurs. The flow of air thus produced causes base oil to be supplied onto the rolling surface. The base oil thus supplied onto the rolling surface is spread over the entire rolling surface due to the revolution of the rolling elements, thereby lubricating the entire bearing. Consequently, the present invention overcomes the problem that providing the seal structure on both sides of the bearing causes degradation of the lubrication performance, and at the same time the present invention prevents leakage of grease or base oil to the outside the bearing and prevents contamination with foreign matter inside the bearing.

In some cases, the seal structure comprises: fixed-side seal portions; and rotating-side seal portions that are opposed to the fixed-side seal portions, respectively. The shield is integrally formed with each fixed-side seal portion on a radially inner side thereof. Each rotating-side seal portion is provided with a recess that accommodates the shield and that is open toward and is opposed to the bearing.

This structure eliminates the need to provide the shields as separate members, which successfully reduces the number of components to be used.

Advantageous Effects of Invention

According to the present invention, base oil of grease can be used while it is circulated in the space of the bearing so as to traverse the rolling surface. Consequently, the present invention is capable of performing grease lubrication appropriately. Additionally, because the structure to cause the flow of air to be produced so as to traverse the rolling surface in the space of the bearing can be disposed inside the seal structure, prevention of the contamination by foreign matter and prevention of leakage of grease or base oil can be realized at the same time. This structure can be realized by simply adding the shields on the both sides of the bearing, and, therefore, can be realized without entailing the substantial increase in cost for the rotation unit.

DESCRIPTION OF EMBODIMENTS

Figure 1:
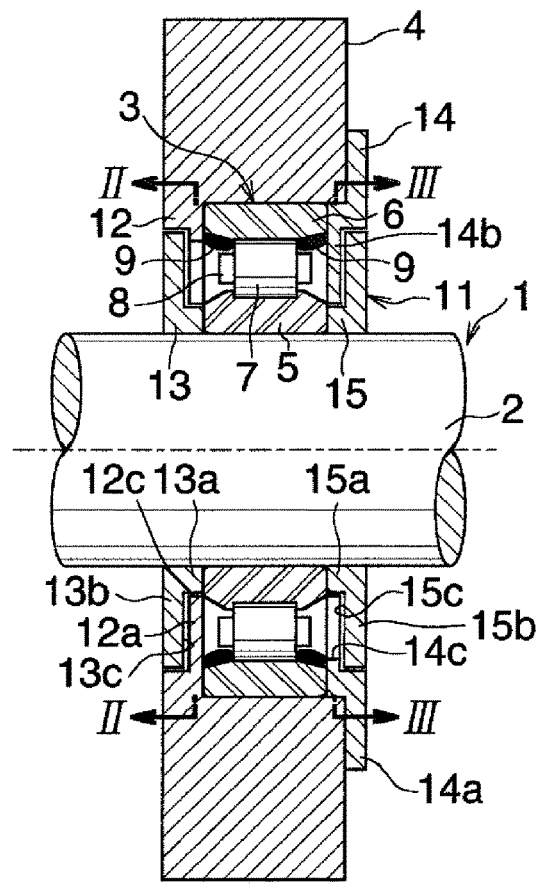
FIG. 1 is a vertical cross-sectional view of a bearing lubrication structure for a rotation unit, according a first embodiment of the present invention.

Hereinafter, embodiments of the present invention will now be described with reference to FIGS. 1 to 8. In the following description, right and left sides in FIG. 1 are referred to as the right and left, respectively.

FIGS. 1 to 4 show a bearing lubrication structure for a rotation unit according to a first embodiment of the present invention. The bearing lubrication structure of the present invention and the conventional one are the same in that grease 9 is used for lubrication of bearings 3 and that a rotation unit 1 includes a rotary shaft 2 and the bearings 3, and are different from each other in that a seal structure 11 of the present invention differs from a conventional structure shown in FIG. 6. In the following description, the seal structure 11, which is the distinguished feature of the present invention, will be described.

As shown in FIG. 1, the seal structure 11 according to the first embodiment includes a left fixed-side seal portion 12 and a left rotating-side seal portion 13 that is opposed thereto, and a right fixed-side seal portion 14 and a right rotating-side seal portion 15 that is opposed thereto.

The left fixed-side seal portion 12 is integrally formed with a housing 4, is located on the left side of a portion where an outer peripheral surface of an outer ring 6 is fitted into the housing 4, and supports a left surface of the outer ring 6. The left fixed-side seal portion 12 includes a radially inner part (hereinafter referred to as "first shield") (12a). The first shield 12a projects radially inward from a reference diameter having an inner diameter that is slightly greater than an inner diameter of the outer ring 6.

The right fixed-side seal portion 14 is formed separately from the housing 4. The right fixed-side seal portion 14 has a radially outer part 14a and a radially inner part (hereinafter referred to as "second shield") 14b. The radially outer part 14a is L-shaped in cross section, has an inner diameter that is slightly greater than the inner diameter of the outer ring 6, is in contact with the outer ring 6, and is fitted into a corner part of the housing 4. The radially inner part (second shield) 14b projects radially inward from the reference diameter having the inner diameter that is slightly greater than the inner diameter of the outer ring 6.

Each of the right and left rotating-side seal portions 13 and 15 are formed separately from the rotary shaft 2 and an inner ring 5, and fitted into the rotary shaft 2. The right and left rotating-side seal portions 13 and 15 are each circular in cross section and have point symmetry. Consequently, the left rotating-side seal portion 13 and the right rotating-side seal portion 15 have plane symmetry.

The rotating-side seal portions 13 and 15 are each L-shaped in cross section, and include small-diameter parts 13a and 15a and large-diameter parts 13b and 15b, respectively. The small-diameter parts 13a and 15a are fitted to the rotary shaft 2 so as to be in noncontact with the inner ring 5. The large-diameter parts 13b and 15b are formed radially outward of the small-diameter parts 13a and 15a and formed integrally therewith, respectively. The large-diameter part 13b has an inner diameter that is identical with that of the small-diameter part 13a and has an outer diameter that is greater than that of the small-diameter part 13a. Likewise, the large-diameter part 15b has an inner diameter that is identical with that of the small-diameter part 15a and has an outer diameter that is greater than that of the small-diameter part 15a. Consequently, the left rotating-side seal portion 13 is provided with a recess 13c that accommodates the first shield 12a and that is open toward the bearing 3 side, and the right rotating-side seal portion 15 is provided with a recess 15c that accommodates the second shield 14b and that is open toward the bearing 3 side.

Figure 2:
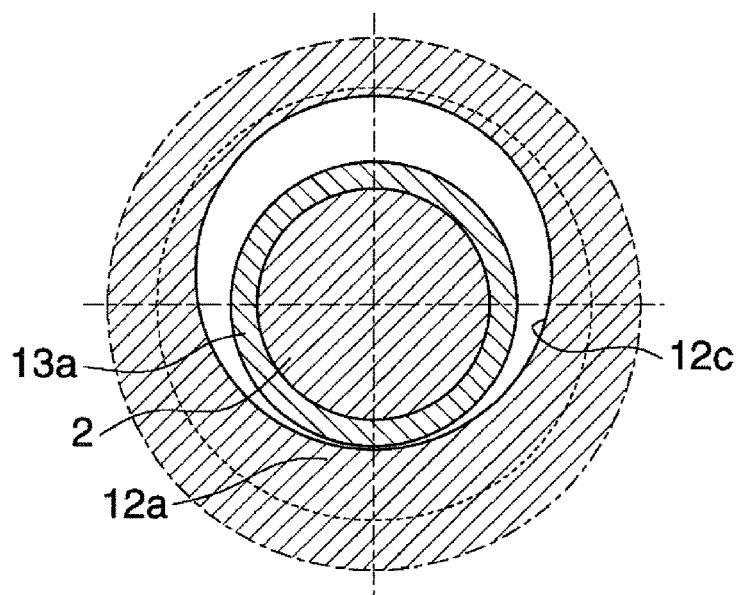
FIG. 2 is a cross-sectional view taken along line II-II in FIG. 1.

As shown in FIG. 2, an inner periphery 12c of the first shield 12a is circular in cross section. The center of the circle is located at a point shifted upward from the axis of the rotary shaft 2. Consequently, the distance from the inner periphery 12c of the first shield 12a to the axis of the rotary shaft varies depending on the location of a point on the inner periphery 12c. In FIG. 1, the lower radius part of the inner periphery 12c excluding the small-diameter part 13a of the rotating-side seal portion 13 is minimum (corresponding to a part where first shield 12a in FIG. 2 is closest to the small-diameter part 13a of the rotating-side seal portion 13), and the upper part of the inner diameter of the inner periphery 12c is maximum (corresponding to a part where the upper part of the first shield 12a in FIG. 2 is farthest to the small-diameter part 13a of the rotating-side seal portion 13).

Figure 3:
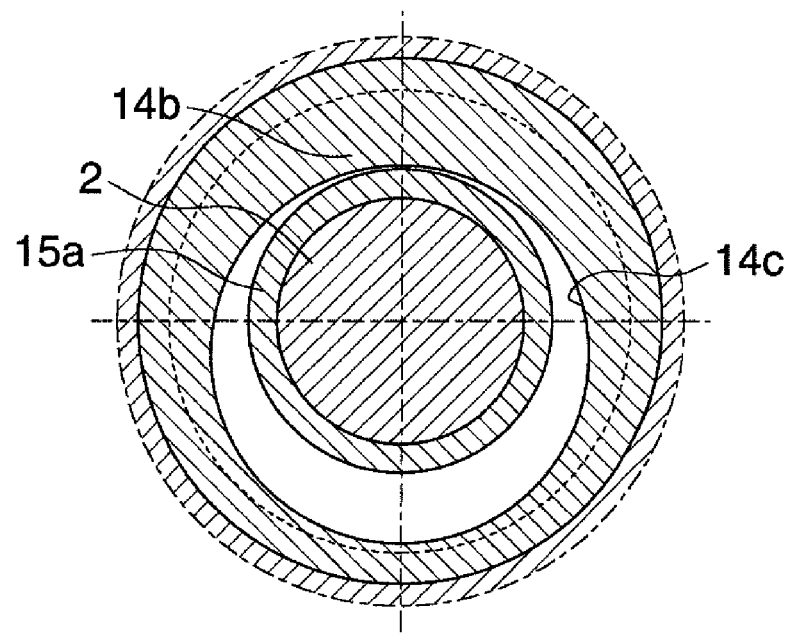
FIG. 3 is a cross-sectional view taken along line III-III in FIG. 1.

As shown in FIG. 3, an inner periphery 14c of the second shield 14b is circular in cross section. The center of the circle is located at a point shifted downward from the axis of the rotary shaft 2. Consequently, the first shield 12a and the second shield 14b are arranged so as not to have plane symmetry, and the distance from an inner periphery 14c of the second shield 14b to the axis of the rotary shaft 2 also varies depending on the location of a point on the inner periphery 14c. In FIG. 1, the lower radius part of the inner periphery 14c of the second shield 14b excluding the small-diameter part 15a of the rotating-side seal portion 15 is maximum (corresponding to a part where the lower part of the second shield 14b in FIG. 3 is farthest to the small-diameter part 15a of the rotating-side seal portion 15), and the upper part of the inner diameter of the inner periphery 14c is minimum (corresponding to a part where the upper part of the second shield 14b in FIG. 3 is closest to the small-diameter part 15a of the rotating-side seal portion 15).

With the bearing lubrication structure for the rotation unit 1 according to the above embodiment, the bearing 3 is lubricated by base oil that has exuded from the grease 9 filled inside the bearing. The bearing 3 is provided on both sides thereof with a seal structure 11, which prevents leakage of grease 9 and base oil to the outside of the bearing 3 and at the same time prevents contamination of grease and base oil by foreign matter.

Inside the seal structure 11, the bearing 3 is provided on both sides thereof with the shields 12a and 14b, the distance from each of which to the axis of the rotary shaft 2 is not constant. These two shields 12a and 14b are arranged such that when one of the shields 12a and 14b is rotated 180 degrees with respect to the other, the two shields have plane symmetry. In other words, the two shields 12a and 14b are arranged so as not to have plane symmetry.

Figure 4:
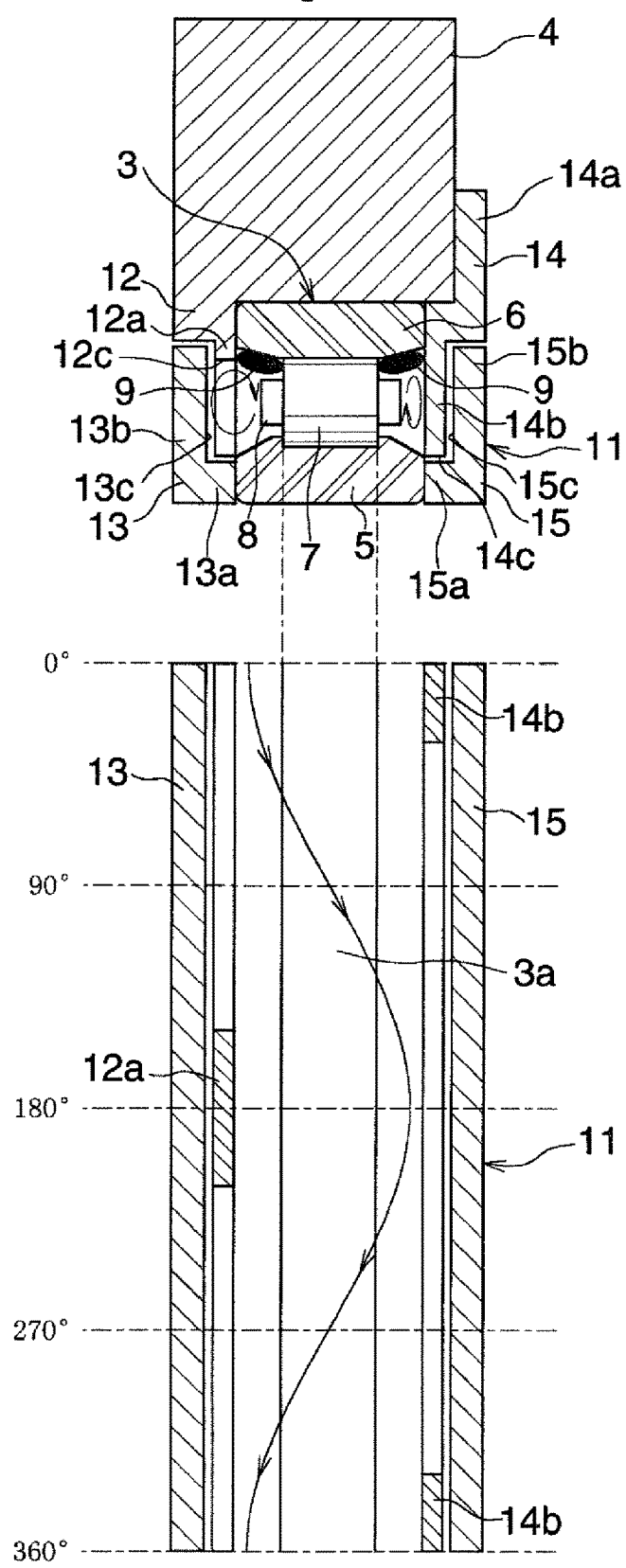
FIG. 4 is a diagram illustrating the flow of air or base oil in the bearing lubrication structure for the rotation unit of the present invention.
Figure 8:
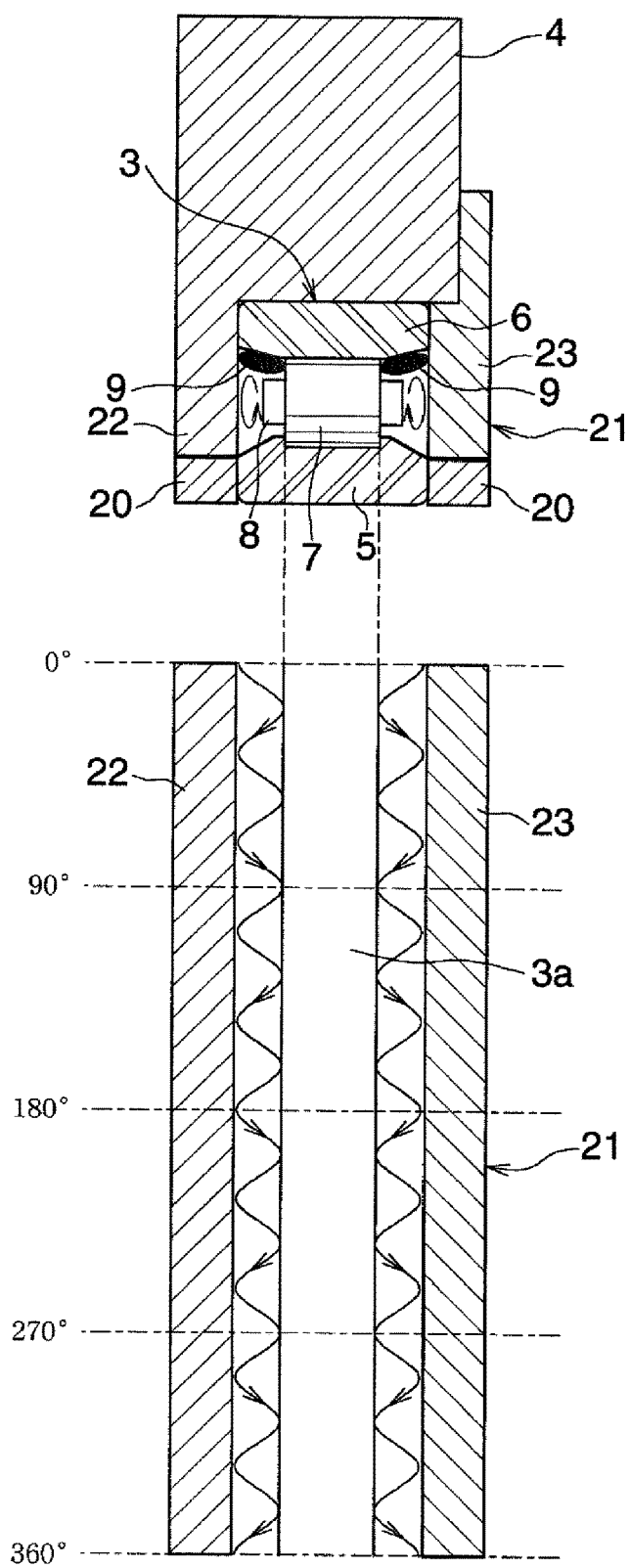
FIG. 8 is a diagram illustrating the flow of air or base oil in the conventional bearing lubrication structure for the rotation unit.

When the rotary shaft 2 is rotated, the flow of air is produced by centrifugal force generated inside. At this time, the difference in magnitude of the flow of air caused due to the shields 12a and 14b arises depending on the location. For example, in the cross section shown in FIG. 1, great centrifugal force is produced on the upper left side and the lower right side, whereas relatively small centrifugal force is produced on the upper right side and lower left side. Because the two shields 12a and 14b do not have plane symmetry, pressure difference produced between the both sides of the bearing 3 causes air to flow in the axial direction such that the air traverses the rolling surface 3a of the bearing 3. The distance from the inner periphery 12c, 14c of the shield 12a, 14b to the axis of the rotary shaft 2 varies depending on the location of a point on the inner periphery 12c, 14c, and therefore the difference in pressure produced between the both sides of the bearing 3 also varies depending on the phase of the bearing 3. Consequently, the path over which the air flows is like a curved zigzag path that traverses the rolling surface 3a, as shown in FIG. 4. In other words, although the flow of air dose not traverse the rolling surface 3a according to the conventional case as shown in FIG. 8, the flow of air traverses the rolling surface 3a according to the present embodiment as shown in FIG. 4 due to the provision of the shields 12a and 14b.

Base oil that has exuded from grease 9 is supplied to the rolling surface 3a, which is carried over the flow of air. The base oil supplied to the rolling surface 3a is spread over the entire rolling surface 3a by the movement of revolution of the rolling elements 7, thereby lubricating the entire bearing 3.

Specifically stated, the shields 12a and 14b may take any shape as long as the distance from the inner periphery 12c, 14c of the shield 12a, 14b to the axis of the rotary shaft 2 varies depending on the location of a point on the inner periphery 12c. For example, the shields may take the shape as shown in FIG. 5, instead of those shown in FIG. 2 and FIG. 3.

Figure 5:
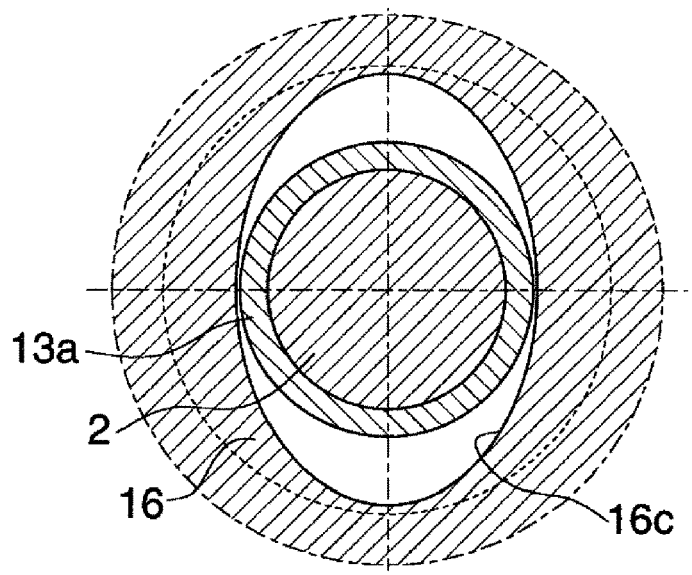
FIG. 5 is a vertical cross-sectional view showing the shape of a seal portion according to another embodiment of the bearing lubrication structure for the rotation unit of the present invention.
Figure 6:
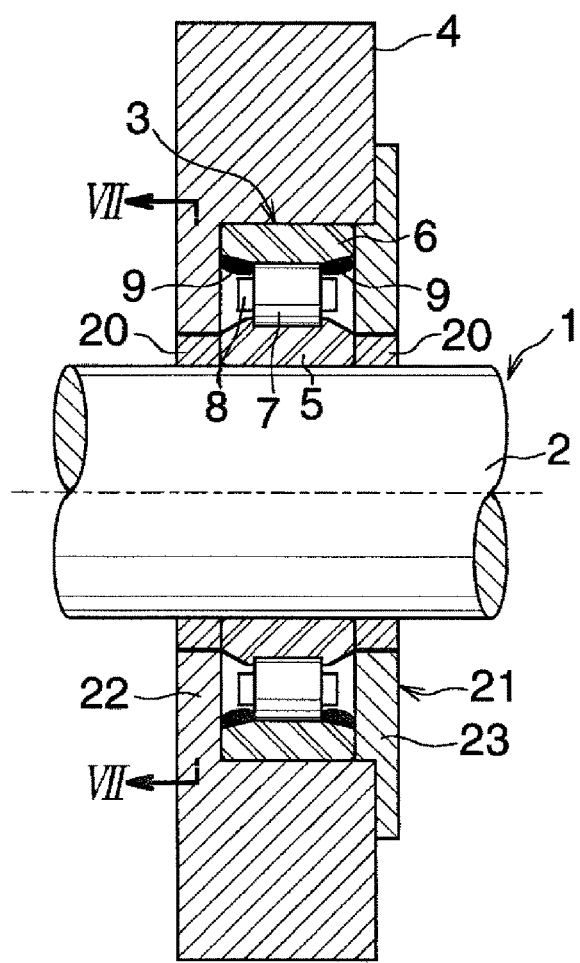
FIG. 6 is a vertical cross-sectional view of a conventional bearing lubrication structure for the rotation unit.
Figure 7:
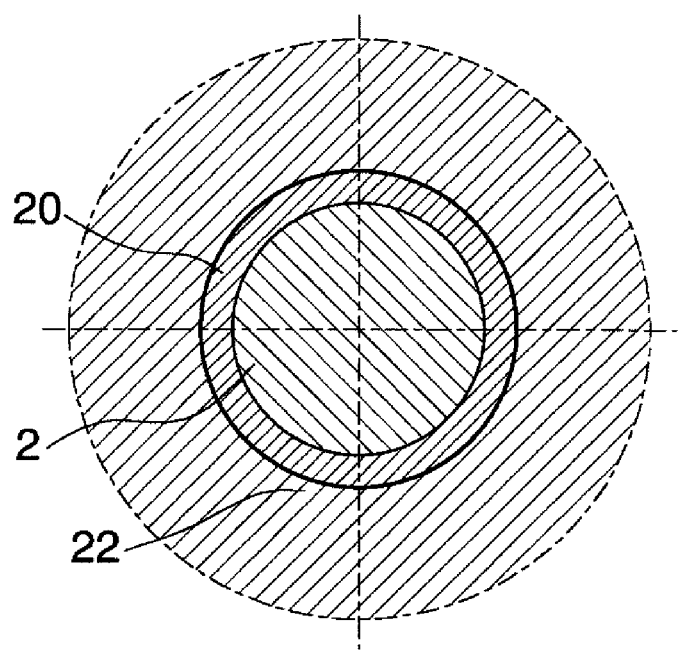
FIG. 7 is a cross-sectional view taken along line VII-VII in FIG. 6.

In FIG. 5, a shield 16 has an inner periphery 16c that has the shape of an ellipse in cross section. When the shields 16 are to be used, one of the shields 16 is rotated 90 degrees with respect to the other such that the two shields 16 have plane symmetry. Consequently, the shields 16 are appropriately arranged so as not to have plane symmetry.

When two shields 16 shown in FIG. 5 are used, air flows so as to travel between the both ends of the rolling surface twice for one rotation.

In the above embodiment, the shields 12a and 14b are integrally formed with the fixed-side seal portions 12 and 14, respectively. However, because the shields 12a and 14b do not contribute to the seal function, the shields 12a and 14b may be separately formed from the fixed-side seal portions 12 and 14, respectively, or may be formed integrally with other fixed members, such as fixed rings, as long as the shields 12a and 14b are provided to the fixed side.

Additionally, in FIG. 1, one of the two shields 12a and 14b may have point symmetry in cross section. In the case where both two shields 12a and 14b do not have point symmetry in cross section, when these two shields 12a and 14b are arranged so as to have plane symmetry, the difference in magnitude of the centrifugal force arises depending on the point of the periphery in each of the right and left shields 12a and 14b but the difference in magnitude of the centrifugal force does not arise between the right and left shields 12a and 14b. Therefore, the shields 12a and 14b need to be arranged so as not to have plane symmetry.

The present invention requires that one of the shields 12a and 14b has a distance from the inner periphery 12c, 14c of the shield 12a, 14b to the axis of the rotary shaft 2 varying depending on the location of a point on the inner periphery 12c, 14c, and that the right and left shields 12a and 14b are arranged so as not to have plane symmetry. As long as these two requirements are satisfied, various seal structures may be used in the present invention. For example, air seal may be used, if such an air seal prevents the flow of air between inside and outside the bearing.

In the above embodiment, each of the rotating-side seal portions 13 and 15 is in noncontact with the inner ring 5 (noncontact seal with a tiny gap). However, each of the rotating-side seal portions 13 and 15 may be brought into contact with the inner ring 5 via a separately formed contact seal portion.

REFERENCE SIGNS LIST

1: rotation unit
2: rotary shaft
3: bearing
11: seal structure
12a: radially inner part of left fixed-side seal portion (first shield)
12c: inner periphery of first shield
14b: radially inner part of right fixed-side seal portion (second shield)
14c: inner periphery of second shield

The invention claimed is:
1. A bearing lubrication structure for a rotation unit including a plurality of bearings and a rotary shaft rotatably supported by the bearings, the bearing lubrication structure being configured to lubricate the bearings using grease, wherein
    a seal structure is provided on both sides of each bearing, and shields are provided on a fixed side between the bearing and the seal structure at both sides thereof,
    in at least one of the shields, a distance from an inner periphery of the shield to an axis of the rotary shaft varies depending on a location of a point on the inner periphery, and
    the at least one of the shields and another of the shields are arranged so as not to have plane symmetry with each other.
2. The bearing lubrication structure for the rotation unit according to claim 1, wherein
    the seal structure comprises: fixed-side seal portions; and rotating-side seal portions that are opposed to the fixed-side seal portions, respectively,
    the shield is integrally formed with each fixed-side seal portion on a radially inner side thereof, and
    each rotating-side seal portion is provided with a recess that accommodates the shield and that is open toward and is opposed to the bearing.
3. The bearing lubrication structure for the rotation unit according to claim 1, wherein
    the inner periphery of the shield has a cross-sectional shape of an eccentric circle with respect to a circle having a center thereof at the axis of the rotary shaft.
4. The bearing lubrication structure for the rotation unit according to claim 1, wherein
    the inner periphery of the shield has a cross-sectional shape of an ellipse.

* * * * *